(12) United States Patent
Weinryb et al.

(10) Patent No.: US 9,243,442 B2
(45) Date of Patent: Jan. 26, 2016

(54) PANELIZED SHADOW BOX

(71) Applicants: Stephen Weinryb, New York, NY (US); Neil McClelland, New York, NY (US)

(72) Inventors: Stephen Weinryb, New York, NY (US); Neil McClelland, New York, NY (US)

(73) Assignees: HOK Product Design, LLC, Culver City, CA (US); Dow Corning Corporation, Midland, MI (US)

( * ) Notice: Subject to any disclaimer, the term of this patent is extended or adjusted under 35 U.S.C. 154(b) by 0 days.

(21) Appl. No.: 14/162,984

(22) Filed: Jan. 24, 2014

(65) Prior Publication Data

US 2014/0208669 A1 Jul. 31, 2014

Related U.S. Application Data

(60) Provisional application No. 61/757,396, filed on Jan. 28, 2013.

(51) Int. Cl.
*E04B 2/88* (2006.01)
*E04B 2/90* (2006.01)
*E04B 2/92* (2006.01)
*E06B 3/67* (2006.01)
*E06B 3/66* (2006.01)

(52) U.S. Cl.
CPC .............. *E06B 3/6617* (2013.01); *E04B 2/88* (2013.01); *E04B 2/92* (2013.01); *E06B 3/6715* (2013.01); *E04B 2/90* (2013.01)

(58) Field of Classification Search
CPC .............. E04B 2/88; E04B 2/90; E04B 2/92; E04B 2/96; E06B 3/6715
USPC .............. 52/204.591, 204.593, 204.597, 235
See application file for complete search history.

(56) References Cited

U.S. PATENT DOCUMENTS

| 3,968,608 | A | * | 7/1976 | Swango ........................... 52/235 |
| 4,000,593 | A |   | 1/1977 | Cypher |
| 4,113,905 | A | * | 9/1978 | Kessler ........................... 428/34 |
| 4,596,099 | A | * | 6/1986 | Kaminaga ........................ 52/235 |
| 4,819,405 | A | * | 4/1989 | Jackson .................. E04C 2/523 52/171.3 |
| 4,831,799 | A | * | 5/1989 | Glover et al. .................... 52/172 |

(Continued)

FOREIGN PATENT DOCUMENTS

JP 2009235702 A * 10/2009

OTHER PUBLICATIONS

Schuco: "Schuco Therm Panels"; Feb. 2004.

(Continued)

*Primary Examiner* — Ryan Kwiecinski
(74) *Attorney, Agent, or Firm* — Bryan W. Bockhop; Bockhop & Associates, LLC

(57) ABSTRACT

In a method of supplying an element for covering a non-vision area in a curtain wall on an architectural structure, a plurality of shadow boxes is prefabricated at a location remote from both a unitized curtain wall assembly shop and the architectural structure. The shadow boxes are prefabricated by sealing an interior spacer between a vision glass panel and a back structure. The back structure includes an insulating material surrounded by a rigid envelope. The vision glass panel, the back structure and the interior spacer define a hermetically sealed void therein. A structural seal is applied about the interior spacer and is affixed to the peripheral edge of the vision glass, the interior spacer and the back structure. The plurality of shadow boxes is then delivered to a selected one of the unitized curtain wall assembly shop and the architectural site.

12 Claims, 7 Drawing Sheets

(56) References Cited

U.S. PATENT DOCUMENTS

| | | | |
|---|---|---|---|
| 5,007,217 A * | 4/1991 | Glover et al. | 52/172 |
| 5,087,489 A * | 2/1992 | Lingemann | 428/34 |
| 5,088,258 A * | 2/1992 | Schield et al. | 52/204.593 |
| 2,184,440 A | 2/1993 | Felix et al. | |
| 5,363,621 A | 11/1994 | Kroll et al. | |
| 5,381,637 A * | 1/1995 | Farag | 52/204.595 |
| 5,452,552 A | 9/1995 | Ting | |
| 5,675,944 A * | 10/1997 | Kerr et al. | 52/172 |
| 5,819,499 A * | 10/1998 | Evason et al. | 52/788.1 |
| 5,893,244 A | 4/1999 | Magoon | |
| 6,311,455 B1 | 11/2001 | Gerard | |
| 6,612,091 B1 * | 9/2003 | Glover | E06B 3/6604 428/34 |
| 7,540,119 B2 | 6/2009 | Milburn | |
| 7,644,549 B2 | 1/2010 | Speck | |
| 7,779,584 B2 | 8/2010 | Arias | |
| 7,937,902 B1 | 5/2011 | Smith et al. | |
| 7,987,644 B2 | 8/2011 | Walker, III et al. | |
| 8,082,710 B2 | 12/2011 | Sigurdson et al. | |
| 8,112,953 B2 | 2/2012 | Neal | |
| 8,171,684 B2 | 5/2012 | Demars et al. | |
| 2003/0024180 A1 * | 2/2003 | Hartig et al. | 52/204.5 |
| 2004/0202803 A1 * | 10/2004 | Hoover | E06B 3/6715 428/34 |
| 2005/0284046 A1 | 12/2005 | Neal | |
| 2006/0037262 A1 * | 2/2006 | Siebert et al. | 52/204.593 |
| 2006/0080915 A1 * | 4/2006 | Vianello et al. | 52/204.593 |
| 2006/0260227 A1 * | 11/2006 | Winfield | 52/204.593 |
| 2007/0261325 A1 * | 11/2007 | Rosskamp et al. | 52/203 |
| 2008/0302059 A1 * | 12/2008 | Du Plessis et al. | 52/786.11 |
| 2009/0139163 A1 * | 6/2009 | Prete et al. | 52/204.593 |
| 2009/0241441 A1 | 10/2009 | Neal | |
| 2011/0041427 A1 * | 2/2011 | Bouesnard | 52/171.3 |
| 2011/0265404 A1 | 11/2011 | Walker, III et al. | |
| 2011/0296771 A1 * | 12/2011 | Miller et al. | 52/171.3 |
| 2012/0260548 A1 * | 10/2012 | Andrulewich | A47G 1/0605 40/743 |
| 2012/0327499 A1 | 12/2012 | Parker et al. | |
| 2014/0331579 A1 * | 11/2014 | Evensen | E04B 2/90 52/204.593 |
| 2015/0113891 A1 * | 4/2015 | Evensen | E04B 2/90 52/204.7 |

OTHER PUBLICATIONS

Saint-Gobain: "Slim Wall"; 2012.
Michno: "Analysis and Design of Spandrel and Shadowbox Panels in Unitized Curtain Walls"; Proceedings of Glass Performance Days Conference, Tampere, Finland, Jun. 12, 2009, publ. Enclos University, Los Angeles, CA.
Boswell: "'Shadow Boxes'—An Architect and Cladding Designers' Search for Solutions"; Glass Processing Days; 2005.
ISA: "Notification of Transmittal of the International Search Report and the Written Opinion of the International Searching Authority, or the Declaration"; mailed Nov. 19, 2014.

* cited by examiner

PANELIZED SHADOW BOX

CROSS-REFERENCE TO RELATED APPLICATION(S)

This application claims the benefit of U.S. Provisional Patent Application Ser. No. 61/757,396, filed Jan. 28, 2013, the entirety of which is hereby incorporated herein by reference.

BACKGROUND OF THE INVENTION

1. Field of the Invention

The present invention relates to architectural devices and, more specifically, a shadow box for use in various building cladding systems including but not limited to unitized and stick system curtain wall, window wall, strongback, punched windows and other framed assemblies and rain screen assemblies.

2. Description of the Related Art

A curtain wall is a non-structural outer covering of a building. A curtain wall serves to provide a desired exterior appearance and to keep exterior environmental elements (e.g., wind, rain, etc.) out of the building. While a curtain wall will impart horizontal forces, such as wind loading, to the structural elements of the building, it does not bear the vertical load of the building (except for its own dead weight). Because it is non-structural, it provides a relatively inexpensive way to finish a building's exterior.

A typical enclosure system such as a curtain wall includes an array of mullions, which are vertical and horizontal elements that hold transparent vision glass and opaque spandrel zones. A typical spandrel zone can consist of the following components: a facing material (such as, aluminum, stone, glass masonry, etc.), insulation, and an air and vapor barrier.

The requirements for thermal insulation and fire separation dictate the need for opaque spandrel panels. In addition, other elements that are not desired to be seen are typically concealed by a opaque panels that can be identical to the spandrel or made of other materials. One way to hide such elements is by substituting opaque glass over the elements to be hidden. However, this approach interrupts the visual effect of the vision glass spandrels, which can be an aesthetically undesirable effect.

To give the illusion of depth, some architects design curtain walls in which the elements to be hid are covered with shadow boxes. A shadow box is a spandrel with a vision glass exterior and an opaque back that is offset by several inches from the vision glass exterior. The opaque back hides the elements to be hidden, while the visual effect of the offset can appear similar to the vision glass glazing of the rest of the curtain wall.

Some shadow boxes are deliberately vented to the exterior of the building, some are inadvertently vented to the interior of the building and some are deliberately fully sealed. If they are vented to the exterior, it is possible for dust, insects and the like to enter the shadow box. It is also possible for condensation to form within the shadow box during hot and humid weather. If they are vented to the interior there may be a pathway for dust to form on the inner (#2) surface of the glazing. During cold weather, there is also a high possibility for condensation to form within the spandrel box. If they are fully sealed and moisture enters the spandrel box, either through faults in the inner or outer seals, then long-term condensation may occur. Dust and dirt collection within a spandrel box, the presence of insects and the like within a spandrel box and the presence of condensation within a spandrel box can all be considered as failures of the spandrel box. Opening an installed shadow box to clean it is not a practical solution to problems involving dirt and moisture.

Another form of shadow box uses a conventional insulating glass unit with a solid frit or coating on the innermost surface of the glass. This system addresses the visual problems of the standard spandrel box solution described above by visually blocking any dirt, dust, insects and the like, and condensation that may form in externally or internally vented or fully sealed shadow boxes. This form of shadow box does not provide the visual depth often desired by the designer. In addition, this form of shadow box may not prevent condensation formation (and it prevents the visual warning that condensation may be forming). Such condensation may lead to failures of the shadow box.

Cladding system like curtain walls can be constructed on-site (in which case they are referred to as "stick systems") or they can be assembled in panels at a unitized assembly shop as part of unitized systems such as unitized curtain walls that are shipped to the construction site. In both cases, shadow boxes are constructed as part of the construction of the panels of the curtain wall. This makes curtain wall construction a time consuming process. Also, since the shadow boxes are constructed on an ad hoc basis, ensuring that their seals and tolerances are suitable for long duration construction can be difficult. Multiple decades of ad hoc shadow box construction has demonstrated that it is hard to achieve an effective hermetic seal into a shadow box made this way. Additionally, when constructing shadow boxes on-site and at unitized assembly shops typically results in the introduction of dust and other impurities into the shadow box, which detracts from the visual effect of the shadow box.

Therefore, there is a need for a prefabricated shadow box unit that employs seals with a long lifetime.

SUMMARY OF THE INVENTION

The disadvantages of the prior art are overcome by the present invention which, in one aspect, is a method of supplying an element for covering a non-vision area in a curtain wall on an architectural structure, in which a plurality of shadow boxes is prefabricated at a location remote from both a unitized curtain wall assembly shop and the architectural structure. The shadow boxes are prefabricated by sealing, with a first airtight and moisture resistant hermetic seal and a second airtight and moisture resistant hermetic seal, an interior spacer between vision glass panel and back structure, the spacer having a length so that the vision glass panel is spaced apart from the back structure, the back structure including a first insulating material and a rigid envelope disposed around the first insulating material, the spacer disposed along a peripheral edge of the vision glass panel and along a peripheral edge of the back structure so as to hold the vision glass panel in a spaced apart relationship from the back structure, so that the first hermetic seal seals the interior spacer to the vision glass panel and so that the second hermetic seal seals the interior spacer to the back structure and so that the vision glass panel, the back structure and the interior spacer define a hermetically sealed void therein. A structural seal is applied about the interior spacer and so as to be affixed to the peripheral edge of the vision glass, the interior spacer and the back structure. The plurality of shadow boxes is then delivered to a selected one of the unitized curtain wall assembly shop and the architectural site.

In another aspect, the invention is a curtain wall system for covering an architectural structure that includes a frame structure that is configured to be affixed to an outer surface of the architectural structure. A plurality of vision glass panels are supported by the frame structure. A plurality of shadow boxes is prefabricated prior to delivery to both a unitized curtain wall assembly shop and the architectural structure. Each of the plurality of shadow boxes is configured to be affixed to the frame structure and configured to cover a non-vision area of the architectural structure. Each of the plurality of shadow boxes includes: a vision glass panel having a peripheral edge; a back structure, having a peripheral edge, the back structure including an insulating material and a rigid envelope disposed around the insulating material; an interior spacer disposed along the peripheral edge of the vision glass panel and along the peripheral edge of the back structure so as to hold the vision glass panel in a spaced apart relationship from the back structure, the interior spacer defining at least one chamber therein into which a desiccant is disposed; a first hermetic seal that seals the interior spacer to the vision glass panel and a second hermetic seal that seals the interior spacer to the back structure so that the vision glass panel, the back structure and the interior spacer define a hermetically sealed void therein; a structural seal disposed about the interior spacer and affixed to the peripheral edge of the vision glass, the interior spacer and the back structure; and a back panel disposed within the hermetically sealed void and against the back structure, the back panel including an aesthetic treatment configured to present a desired visual effect to viewers looking through the vision glass panel.

In yet another aspect, the invention is a shadow box for use with an architectural curtain wall system that includes a vision glass panel having an outside #1 surface, an opposite inside #2 surface and a peripheral edge. A back structure has a peripheral edge and includes a first insulating material and a rigid envelope disposed around the first insulating material. An interior spacer defines a plurality of chambers therein in which a desiccant is placed. The interior spacer is disposed along the peripheral edge of the inside #2 surface of the vision glass panel and along the peripheral edge of the back structure so as to hold the vision glass panel in a spaced apart relationship from the back structure. A first polyisobutylene seal seals the interior spacer to the vision glass panel and a second polyisobutylene seal seals the interior spacer to the back structure so that the vision glass panel, the back structure and the interior spacer define a hermetically sealed void therein. The spacer has a length so that the vision glass panel is spaced apart from the back structure by more than 1 inch. A silicone seal is disposed about the interior spacer and is affixed to the peripheral edge of the vision glass, the interior spacer and the back structure so as to provide structural support thereto. The shadow box has been prefabricated prior to insertion into a pre-assembled frame structure.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
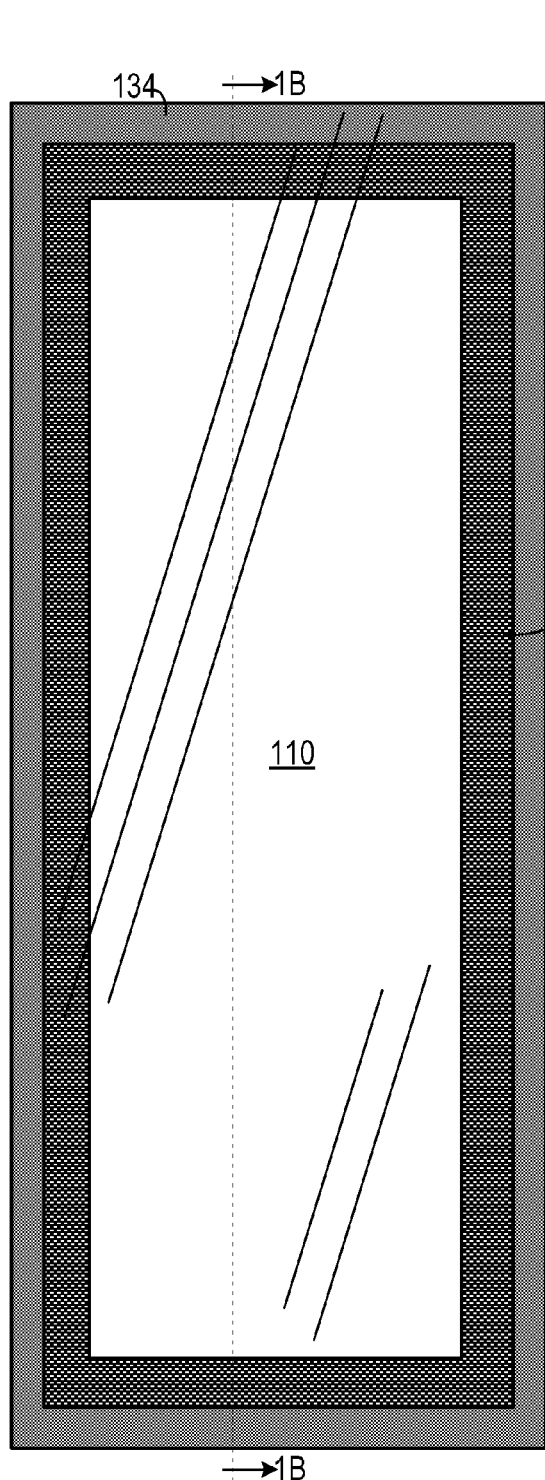
FIG. 1A is a front elevational view of one embodiment of a shadow box.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1B:
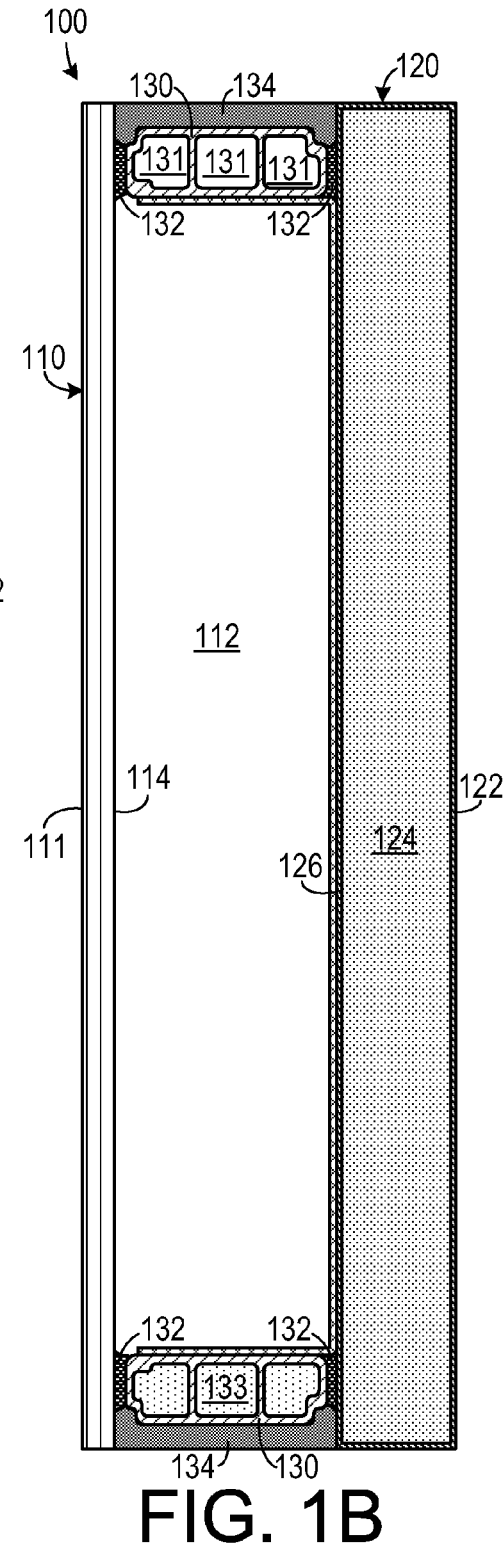
FIG. 1B is a cross sectional view of the embodiment shown in FIG. 1A, taken along line 1B-1B.

As shown in FIGS. 1A and 1B, one embodiment of a prefabricated shadow box 100 includes a vision glass panel 110 that is spaced apart from a back structure 120 so as to define a void 112 therebetween. The void 112 could include air, or it could include an inert gas (such as argon or krypton) to improve the thermal qualities of the shadow box 100. The vision glass panel 110 includes an outside (#1) surface 111 and an opposite inside (#2) surface 114. The inside (#2) surface 114 of the vision glass panel 110 can include a coating to give the glass a desired visual or thermal effect. A metal panel 126 covers the back structure 120 and can be painted, textured, or both, to give a desired visual effect.

Spacers 130 separate the vision glass panel 110 from the back structure 120, which typically would be at a distance of between 1" and 6". The spacers 130 could include multiple chambers 131 in which a desiccant 133 can be disposed so as to control humidity in the void 112. In one representative embodiment, the spacers 130 comprise extruded nylon.

The spacers 130 are sealed to the vision glass panel 110 and to the back structure 120 with a sealing material 132 that hermetically seals the void 112 from the external environment. The spacer 130 is typically desiccant filled to manage any moisture that may be in the void 112 as a result of the assembly process. In one embodiment, the sealing material 132 may comprise a polyisobutylene (PIB) sealant. This sealing material 132 greatly minimizes moisture and gasses from entering and leaving the void 112 from or to the exterior of the shadow box 100.

A silicone seal 134 holds the spacers 130 and the vision glass panel 110 in alignment with the back structure 120. In one embodiment, the structural seal 134 comprises a construction grade silicone sealant.

The back structure 120 includes a metal envelope 122, which can include aluminum, with an insulation material 124 sealed therein. While the insulation material 124 could comprise such materials as mineral wool or polyisocyanurate, it could also include a newer low density silica-fume based insulation material or an aerogel. The rigid structure of the metal envelope 122 protects such fragile materials sufficiently so as to prevent damage thereto during assembly. The edges and seams of the metal envelope 122 may be sealed to provide a continuous air and vapor barrier.

Additionally, in some embodiments, items can be placed into the void 112 for specific purposes. For example, a lattice or grill can be place against the back panel 126 to create a desired visual effect. Long lifetime LED lights could be placed into the void 112 for the purpose of creating visual effects at night. Light collectors, heat recovery panels and solar energy panels could also be coupled to the back panel 126 to harvest solar energy. Generally, to place an item inside the void 112, it should be of a type that has a working lifespan that is equal to the projected lifespan of the building because repair or replacement would be quite difficult once the shadow box 100 has been installed.

Figure 2:
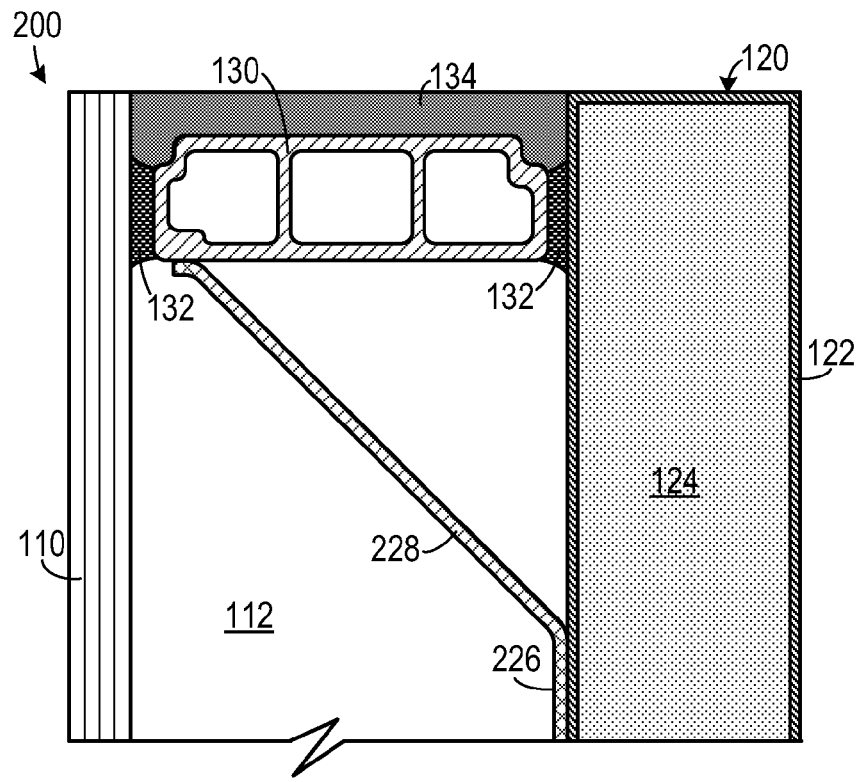
FIG. 2 is a cross-sectional view of a corner of a second embodiment of a shadow box.

In an alternative embodiment of a shadow box 200, as shown in FIG. 2, the metal panel 226 that covers the back structure 120 can include an angled surface 228 so as not to form a definite corner. Use of an angled surface 228 can increase the perception of depth.

Figure 3:
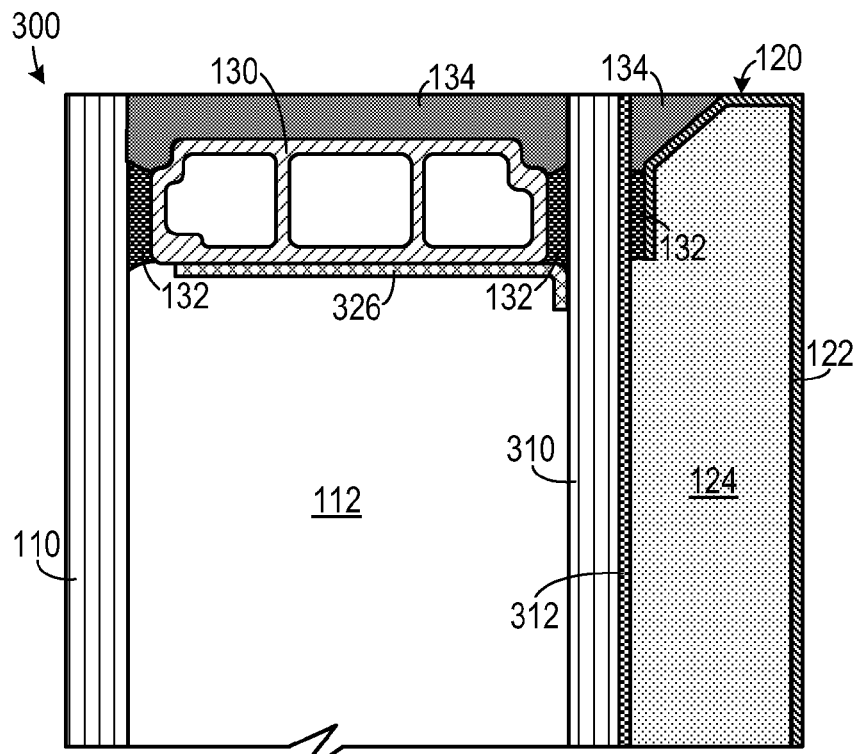
FIG. 3 is a cross-sectional view of a corner of a third embodiment of a shadow box.

In another alternate embodiment, as shown in FIG. 3, the back structure can include a second layer of glass 310 to give the shadow box 300 a more window-like appearance. A flood coat frit 312 can be applied to the back (#4) surface to give the glazing 310 a desired effect. The spacer 130 cover 326 could be a painted metal sheet or a paint coating applied directly to the spacer 130.

Figure 4:
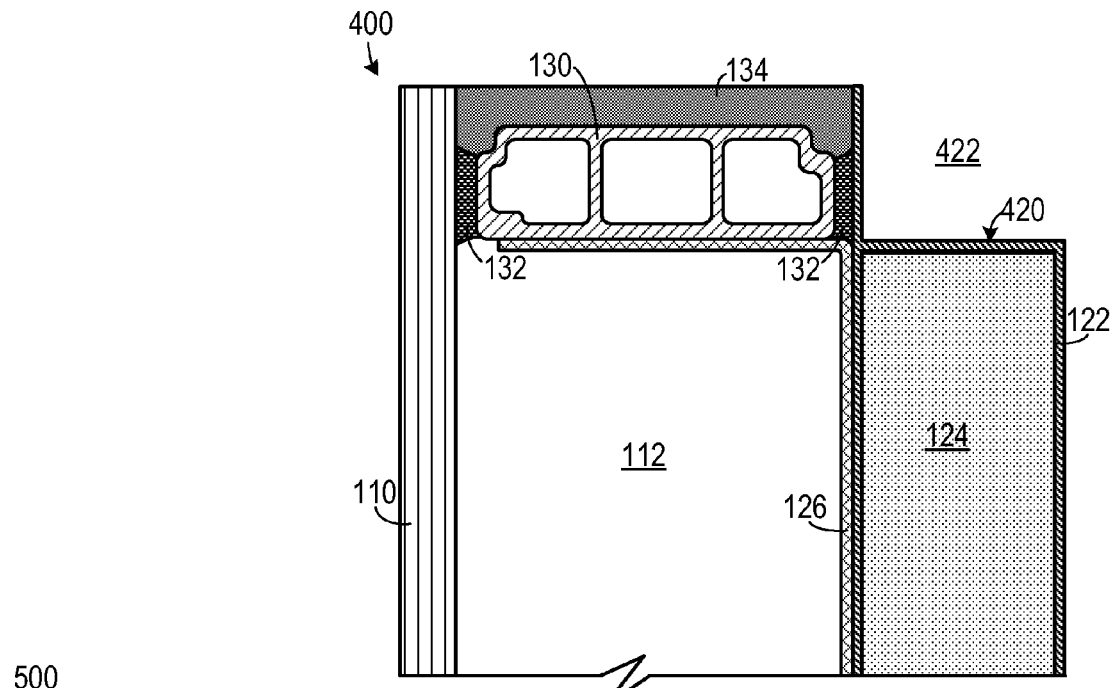
FIG. 4 is a cross-sectional view of a corner of a fourth embodiment of a shadow box.
Figure 5A:
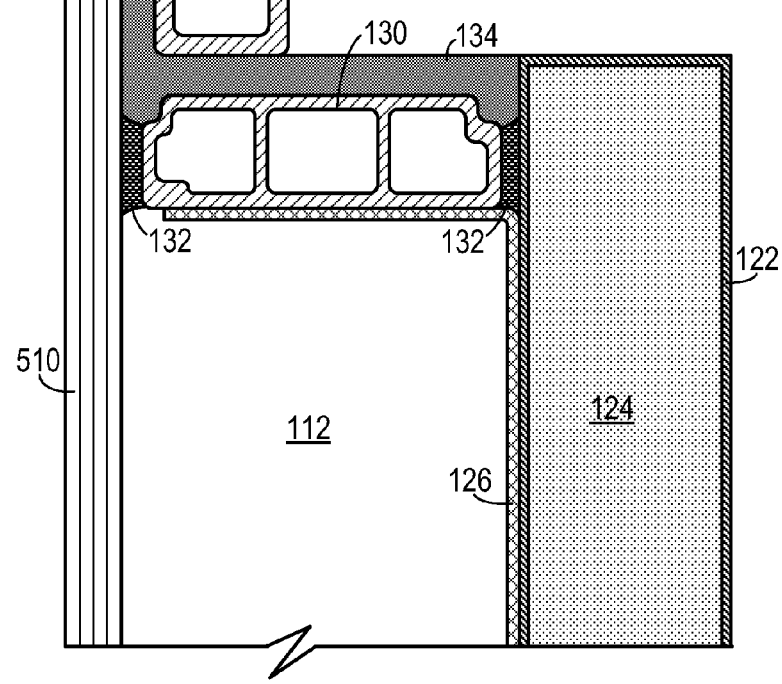
FIG. 5A is a cross-sectional view of a corner of a fifth embodiment of a shadow box.
Figure 5B:
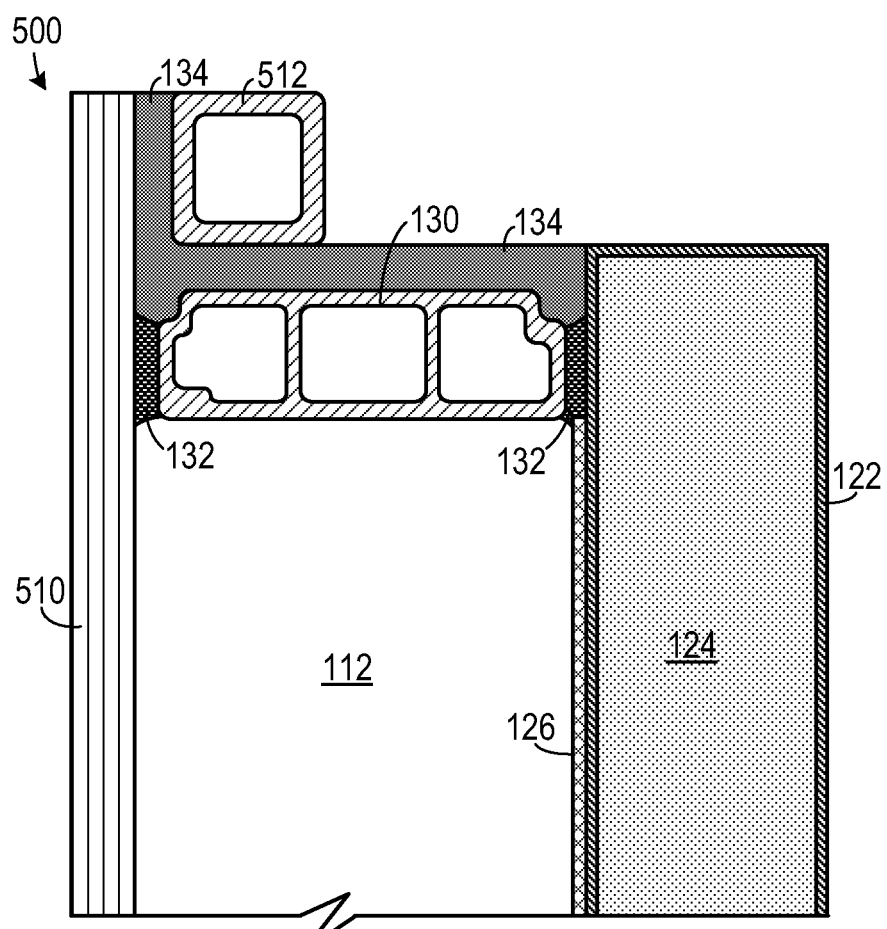
FIG. 5B is a cross-sectional view of a corner of a sixth embodiment of a shadow box.

In another alternate embodiment of a shadow box 400, as shown in FIG. 4, the back structure 420 can be offset to define an open area to accommodate the placement within certain mullion configurations. Similarly, another embodiment of a shadow box 500, as shown in FIG. 5A, can include an extended exterior glazing 510 and an exterior spacer 512 for use with certain existing frames. As will be well understood by those of skill in the art, many combinations of these configurations, and many other configurations are possible without departing from the scope of the invention. As shown in FIG. 5B, if the spacer 130 has a desired aesthetic effect, then it can be left uncovered within the void 112.

Figure 5C:
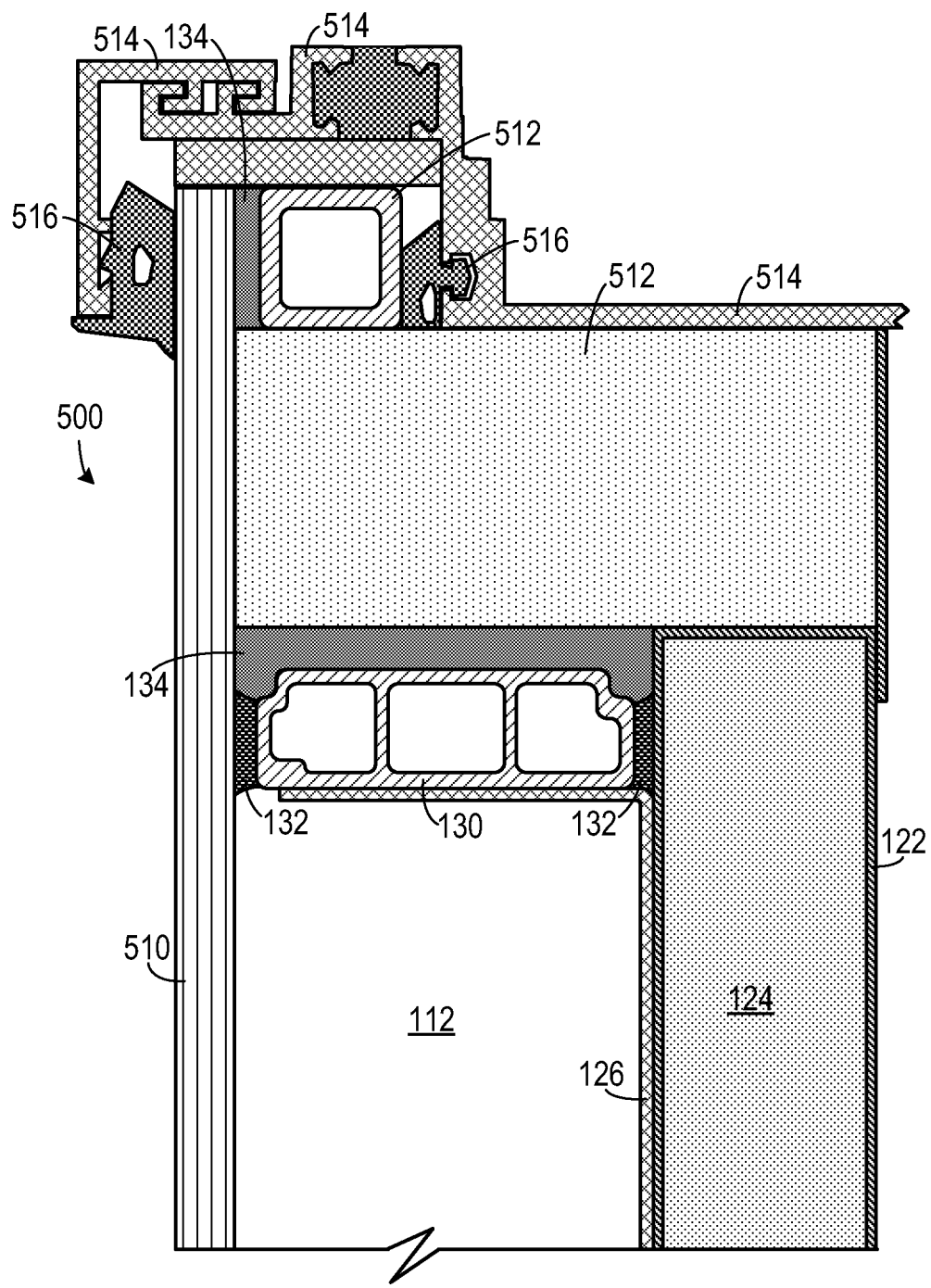
FIG. 5C is a cross-sectional view of a corner of a seventh embodiment of a shadow box.

As shown in FIG. 5C, the exterior glazing 510 can be extended further to accommodate the spacing of an existing curtain wall mullion system (which could include, for example, metal mullion elements 514 and seals 516). Such an embodiment would include an insulation member 512 to fill in the space between the shadow box system 500 and the mullion elements 514. The insulation member 512 could include a block of an insulating material such as an aerogel, or one of the many other types of insulating materials commonly known in the construction arts.

Figure 6A:
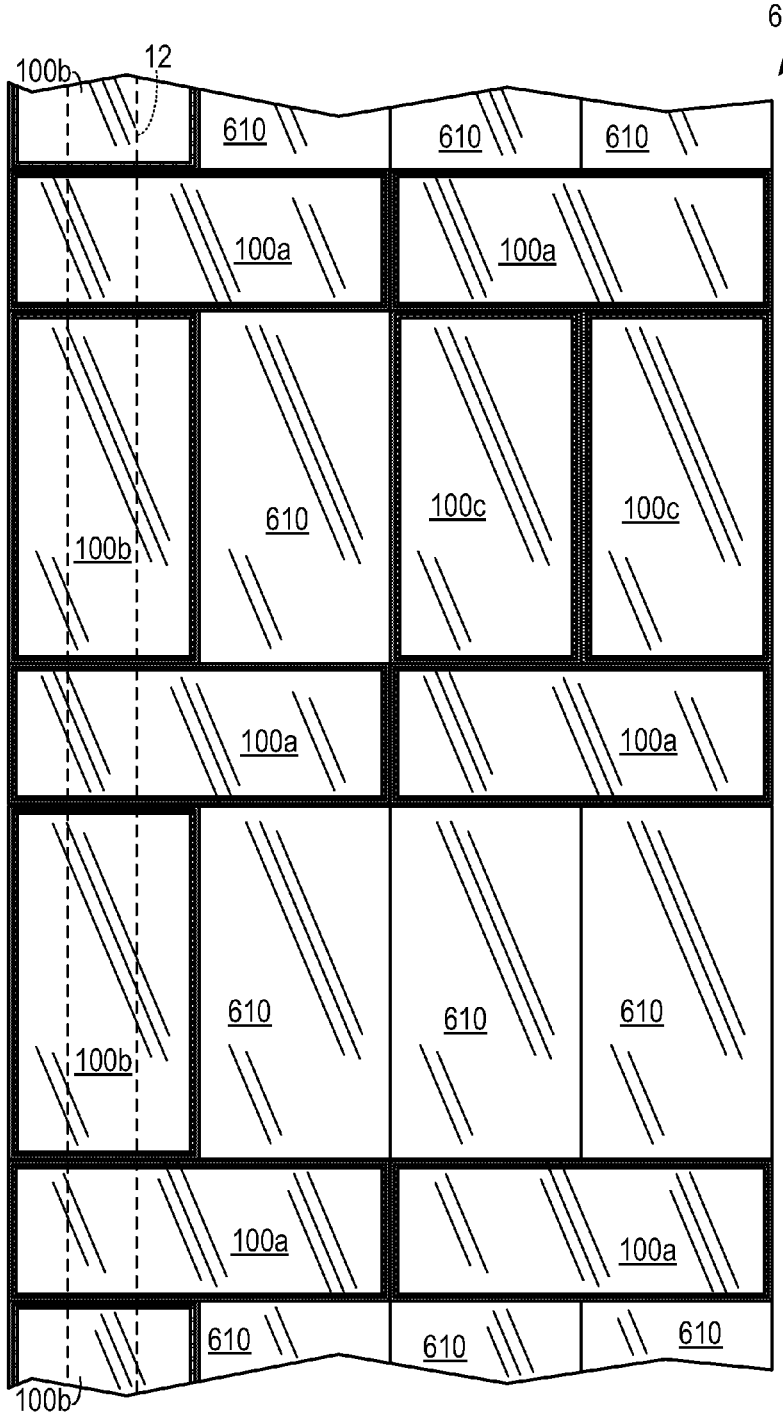
FIG. 6A is a front elevational view of a portion of a curtain wall employing shadow boxes.
Figure 6B:
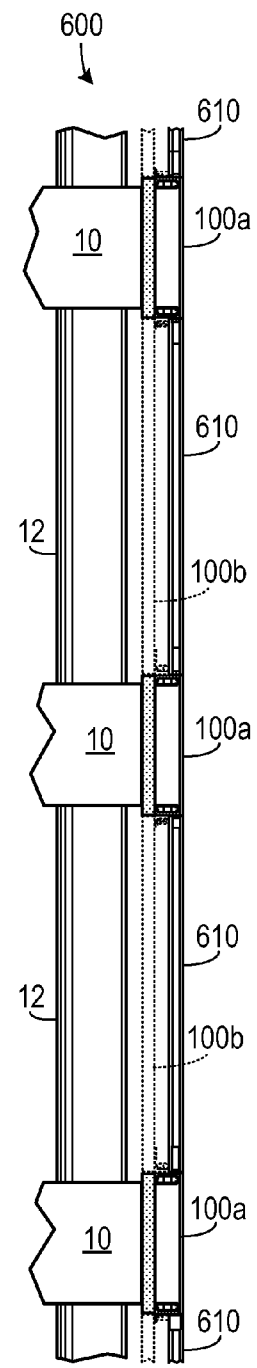
FIG. 6B is a cross sectional view of the portion of a curtain wall shown in FIG. 6A.

As shown in FIGS. 6A and 6B, a curtain wall 600 can be formed from a plurality of vision glazing panels 610 and shadow box units 100a-c. (For simplicity, the mullions are not shown explicitly in this drawing.) As can be seen, horizontal shadow boxes 100a can be used to hide subfloor structures 10. Vertical shadow boxes 100b can be used to hide columns 12. Several shadow boxes 100c can be placed next to each other to hide other areas (such as data centers or utility rooms). Thus, areas are hidden while still presenting a glazed exterior appearance. In addition, this shadow box can be used in any location on a building enclosure system, including curtain walls, where solid non-transparent panels are desired.

Figure 7:
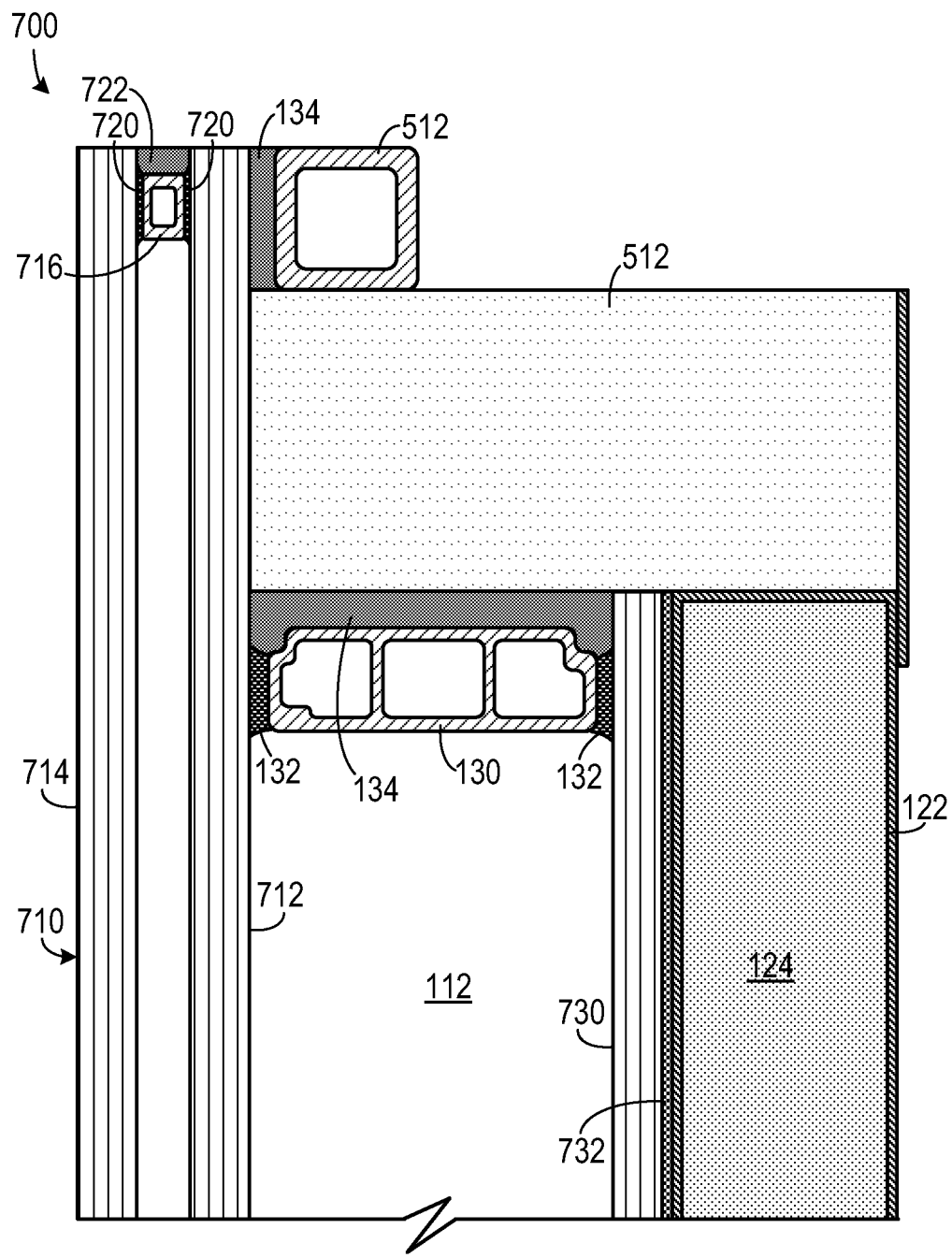
FIG. 7 is a cross-sectional view of a corner of a seventh embodiment of a shadow box.

As shown in FIG. 7, the shadow box 700 can include a triple-glazed system, in which the vision glass panel 710 can include a first vision glass pane 714 and a second glass pane 712 that are separated by a spacer 716. The spacer 716 is hermetically sealed with a sealing material 720 and supported by a structural sealant 722. A back panel 730 could include a third glass pane to which is applied a ceramic frit 732.

The above described embodiment of a panelized shadow box addresses the potential technical and visual deficiencies of current state of the art shadow box construction as it provides a deep hermetically sealed shadow box cavity constructed using processes and materials as used in the manufacture of insulating glass units.

The above described embodiment of a panelized shadow box minimizes site installation works as all of the components of a shadow box are preassembled into a panel. The minimization of installation time can lead to reduced site labor costs and increased speed of construction.

The described embodiments of a panelized shadow box improves shadow box quality as the shadow box panel is fabricated under factory conditions where better quality control than ad hoc site installation is possible. The improvement in shadow box quality offers the additional advantages of reducing ongoing maintenance costs and extending the service life of the shadow box.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A shadow box for use with an architectural curtain wall system, comprising:
   (a) a vision glass panel having an outside surface, an opposite inside surface and a peripheral edge;
   (b) an opaque back structure, having a peripheral edge, the opaque back structure including a first insulating material and a rigid metal envelope disposed around the first insulating material in which the insulating material includes a solid component;
   (c) an interior spacer, defining a plurality of chambers therein in which a desiccant is placed, disposed along the peripheral edge of the inside surface of the vision glass panel and along the peripheral edge of the opaque back structure so as to hold the vision glass panel in a spaced apart relationship from the opaque back structure;
   (d) a first polyisobutylene seal that seals the interior spacer to the vision glass panel and a second polyisobutylene seal that seals the interior spacer to the opaque back structure so that the vision glass panel, the opaque back structure and the interior spacer define a hermetically sealed void therein, the spacer having a length so that the vision glass panel is spaced apart from the opaque back structure by more than 1 inch; and
   (e) a silicone seal disposed about the interior spacer and affixed to the peripheral edge of the vision glass, the interior spacer and the opaque back structure so as to provide structural support thereto,
      wherein the shadow box has been prefabricated prior to insertion into a pre-assembled frame structure.

2. The shadow box of claim 1, wherein the first insulating material is selected from a group of insulating materials consisting of: a mineral wool, a polyisocyanurate, a vacuum sealed fumed silica, and an aerogel.

3. The shadow box of claim 1, wherein the vision glass panel comprises at least two spaced-apart glass panes.

4. The shadow box of claim 1, further comprising a back panel disposed within the hermetically sealed void and against the opaque back structure.

5. The shadow box of claim 4, further comprising an interior spacer cover that is contiguous with the back panel and disposed within the void so as to cover at least a portion of the interior spacer so as to hide the interior spacer.

6. The shadow box of claim 4, wherein the back panel comprises a metal plate.

7. The shadow box of claim 4, wherein the back panel includes a central portion and a peripheral portion that extends outwardly from the opaque back structure thereby creating an illusion of depth.

8. A shadow box for use with an architectural curtain wall system, comprising:
   (a) a vision glass panel having an outside surface, an opposite inside surface and a peripheral edge;
   (b) an opaque back structure, having a peripheral edge, the opaque back structure including a first insulating material and a rigid metal envelope disposed around the first insulating material in which the insulating material is selected from a group of insulating materials consisting of: an aerogel, a mineral wool, a polyisocyanurate, a vacuum sealed fumed silica;
   (c) an interior spacer, defining a plurality of chambers therein in which a desiccant is placed, disposed along the peripheral edge of the inside surface of the vision glass panel and along the peripheral edge of the opaque back structure so as to hold the vision glass panel in a spaced apart relationship from the opaque back structure;
   (d) a first polyisobutylene seal that seals the interior spacer to the vision glass panel and a second polyisobutylene seal that seals the interior spacer to the opaque back structure so that the vision glass panel, the opaque back structure and the interior spacer define a hermetically sealed void therein, the spacer having a length so that the vision glass panel is spaced apart from the opaque back structure by more than 1 inch; and
   (e) a silicone seal disposed about the interior spacer and affixed to the peripheral edge of the vision glass, the interior spacer and the opaque back structure so as to provide structural support thereto,
   wherein the shadow box has been prefabricated prior to insertion into a pre-assembled frame structure.

9. The shadow box of claim 8, further comprising a back panel disposed within the hermetically sealed void and against the opaque back structure.

10. The shadow box of claim 9, further comprising an interior spacer cover that is contiguous with the back panel and disposed within the void so as to cover at least a portion of the interior spacer so as to hide the interior spacer.

11. The shadow box of claim 9, wherein the back panel comprises a metal plate.

12. The shadow box of claim 9, wherein the back panel includes a central portion and a peripheral portion that extends outwardly from the opaque back structure thereby creating an illusion of depth.

* * * * *